Figure 1:
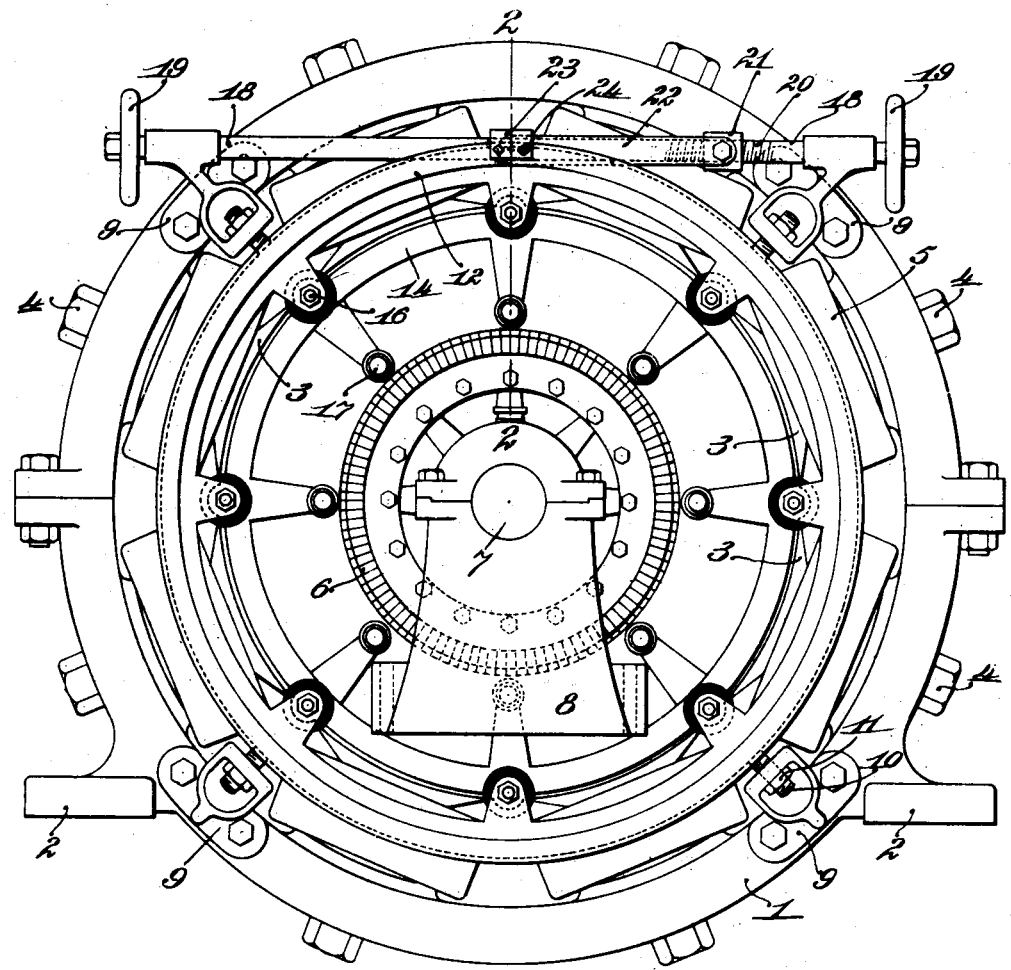

No. 713,589. Patented Nov. 18, 1902.
H. A. BALCOME.
BRUSH HOLDER SUPPORT.
(Application filed Mar. 8, 1902.)
(No Model.)

Witnesses
Edward S. Day
Fred O. Fish

Inventor
Herbert A. Balcome
by his Attorney
Benjamin Phillips

UNITED STATES PATENT OFFICE.

HERBERT A. BALCOME, OF JAMAICA PLAIN, MASSACHUSETTS, ASSIGNOR TO B. F. STURTEVANT COMPANY, OF BOSTON, MASSACHUSETTS, A CORPORATION OF MASSACHUSETTS.

BRUSH-HOLDER SUPPORT.

SPECIFICATION forming part of Letters Patent No. 713,589, dated November 18, 1902.

Application filed March 8, 1902. Serial No. 97,250. (No model.)

*To all whom it may concern:*

Be it known that I, HERBERT A. BALCOME, a citizen of the United States, residing at Jamaica Plain, in the county of Suffolk and State of Massachusetts, have invented certain new and useful Improvements in Brush-Holder Supports; and I do hereby declare the following to be a full, clear, and exact description of the invention, such as will enable others skilled in the art to which it appertains to make and use the same.

The present invention relates to brush-holder supports for dynamo-electric machines, and more particularly to that type of brush-holder supports which comprises a brush-supporting ring or rings surrounding the commutator. In this type of brush-holder supports as heretofore constructed the brush-supporting ring has been supported in bearings formed in brackets secured to the magnet-frame of the machine and extending inwardly toward the commutator or has been supported in a bearing formed in the magnet-frame of the machine. These constructions necessitate accurate machining of the machine-frame or of the brackets secured thereto in order that the brush-supporting ring may be supported concentrically with the commutator; and one of the objects of my invention is to provide an improved construction whereby such machining of the machine-frame or of the supporting-brackets is rendered unnecessary and the cost of manufacture materially reduced.

Brush-holder supports comprising a brush-supporting ring surrounding the commutator have been heretofore provided with mechanism whereby the ring can be adjusted circumferentially in order to change the position of the brushes on the commutator. All mechanisms for adjusting the brush-supporting ring which have been heretofore devised, so far as I am aware of the state of the art, have been so arranged that they can be operated from one side of the machine only. Also these mechanisms have been permanently connected to the brush-supporting ring, so that only a limited adjustment of the ring is possible.

Another object of my invention is therefore to provide mechanism for adjusting the brush-supporting ring which may be operated from either side of the machine, and still another object of my invention is to provide a mechanism for adjusting the brush-supporting ring which may be disconnected therefrom to allow the ring to be adjusted independently of such mechanism and which may be thereafter connected to the brush-supporting ring in its adjusted position.

Other objects of my invention are to improve the construction, arrangement, and organization of brush-holder supports comprising a brush-supporting ring or rings surrounding the commutator.

To the above ends my invention consists in providing supports for the brush-supporting ring adjustable toward and from the commutator whereby such supports can be adjusted to form bearings for the ring concentric with the armature and accurate machining of the supports or of the machine-frame to form such bearing is rendered unnecessary.

My invention also consists in providing a mechanism for adjusting the brush-supporting ring constructed and arranged so as to be conveniently operated from either side of the machine.

My invention also consists in providing a mechanism for adjusting the brush-supporting ring constructed and arranged to be disconnected therefrom to allow the ring to be adjusted independently of such adjusting mechanism and to be connected to the brush-supporting ring after it has been adjusted.

My invention also consists in the devices and combinations of devices hereinafter described and claimed, the advantages of which will be obvious to those skilled in the art from the following description.

In carrying out my invention any desired form of supports for the brush-supporting ring may be provided, and these supports may be adjustable in any desired manner. The simplest and most efficient form of such adjustable supports which I have been able to devise consists of adjustable screws passing through brackets projecting from the magnet-frame of the machine and engaging a groove formed in the peripheral surface of the brush-supporting ring. Also the mechanism for adjusting the ring may be of any desired construction and arrangement. The mechanism which I prefer to use, however, on account of its simplicity of construction and efficiency of operation consists of a screw-threaded shaft upon which is mounted a traveling nut and connections between the nut and the brush-supporting ring arranged to be disconnected therefrom to allow the ring to be adjusted independently and to be thereafter connected to the ring in its adjusted position. In order to enable the screw-threaded shaft to be operated from either side of the machine, it is preferably arranged to extend across the machine and is provided at each end with means whereby it may be actuated.

The preferred form of my invention is illustrated in the accompanying drawings, which disclose an electric motor or generator embodying the several features of the same. It is to be understood, however, that each of the features of my invention might be embodied in an electric motor or generator in which the other features were absent and that except as specifically recited in the claims the several features of my invention are not limited to the construction and arrangement of parts illustrated.

Having thus indicated the nature and scope of my invention, I will now proceed to describe the specific embodiment thereof illustrated in the accompanying drawings, in which—

Figure 2:
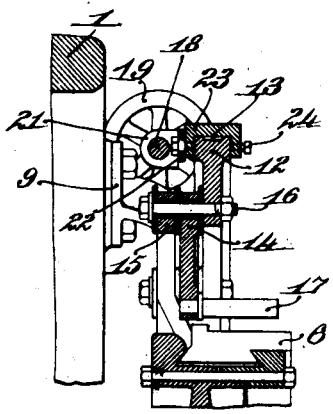

Figure 1 is a view in end elevation of an electric motor or generator provided with a brush-supporting ring and mechanism for adjusting the same embodying my invention in its preferred form, and Fig. 2 is a detail sectional view on the line 2 2 of Fig. 1.

Referring to the drawings, 1 indicates the magnet-frame of the machine, cylindrical in shape, provided with projecting lugs 2, by means of which it is supported upon a suitable base. (Not shown.)

3 indicates the pole-pieces of the field-magnets, which are secured to the magnet-frame by means of bolts 4 and are surrounded by field-magnet coils 5.

6 indicates the commutator of the armature, and 7 the armature-shaft, which is mounted in bearings in uprights secured to the base of the machine, one of which is shown at 8 in Fig. 1. Secured to the magnet-frame 1 and projecting laterally and inwardly therefrom are a series of brackets 9. Through the laterally-extending portion of each of these brackets a screw 10 passes, having a screw-threaded engagement therewith and being provided with a locking-nut 11. The axes of these screws pass through the axis of the armature-shaft 7, so that the screws are adjustable radially toward and from the commutator 6. The brush-supporting ring is indicated at 12 and is supported concentrically with the commutator 6 by means of the inner ends of the screws 10, which engage a groove 13, (see Fig. 2,) formed in the peripheral surface of the ring. It will be seen that the screws 10 can be adjusted toward and from the commutator, and thus caused to engage the ring 12 and support it concentrically with the commutator. It will also be seen that the screws form an extremely simple and efficient means whereby the brush-supporting ring is supported in proper position and that no expensive machine is required in order to form the bearing for supporting the ring.

The brushes are supported from the ring 12 by means of two brush-rings 14 and 15, which are secured to the ring 12 by means of bolts 16 and insulated from the ring 12 and from each other by means of suitable insulating sleeves and washers, as is clearly shown in Fig. 2. The brush-rings 14 and 15 are provided with inwardly-extending arms, from the inner ends of which brush-holder-supporting studs 17 project laterally over the commutator. The arms extend alternately from the two rings, and the arms extending from the ring 15 are bent, as shown in Fig. 2, to bring the inner ends of these arms into the same vertical plane with the inner ends of the arms projecting from the ring 14. By arranging the inner ends of the arms of both rings in the same plane all of the studs 17 bear the same relation to the commutator, and the brush-holders can be supported on the studs in the same manner.

The mechanism for adjusting the brush-supporting ring 12 in order to adjust the position of the brushes on the commutator comprises a shaft 18, extending horizontally across the upper portion of the magnet-frame and journaled at each end in bearings in the two upper brackets 9. To each end of the shaft 18 is secured a hand-wheel 19, by means of which the shaft 18 can be actuated. This arrangement of the shaft 18 and of the hand-wheels 19 enables the attendant in charge of the machine to conveniently actuate the shaft from either side of the machine. The shaft 18 is provided with a screw-threaded portion 20, with which a traveling nut 21 engages. The nut 21 is connected, by means of a link 22, to a block 23, provided with a groove to receive the ring 12 and clamped to the ring by means of clamping-screws 24. The clamping-screws 24 bear against the side of the ring 12, and it will be seen that the block 23 can be disconnected from the ring 12 by loosening the clamping-screws and then rotated about the commutator to adjust the brushes in any desired position and that thereafter the block 23 can be again secured to the ring 12 in its adjusted position by tightening the clamping-screws 24. The ring 12 can thus be adjusted to shift the brushes around the commutator to any desired extent.

Having thus described my invention, I claim as new and desire to secure by Letters Patent of the United States—

1. A dynamo-electric machine, having, in combination, a commutator, a brush-supporting ring, and supports for said ring adjustable toward and from the commutator, substantially as described.

2. A dynamo-electric machine, having, in combination, a commutator, a brush-supporting ring, and supports for said ring adjustable toward and from the commutator arranged to engage the peripheral surface of the ring, substantially as described.

3. A dynamo-electric machine, having, in combination, a commutator, a brush-supporting ring, and screws for supporting said ring adjustable toward and from the commutator arranged to engage the peripheral surface of the ring, substantially as described.

4. A dynamo-electric machine, having, in combination, a commutator, a brush-supporting ring provided with a groove in its peripheral surface, and screws for supporting said ring adjustable toward and from the commutator arranged to engage said groove, substantially as described.

5. A dynamo-electric machine, having, in combination, a brush-supporting ring, supports for said ring on the magnet-frame and brush-rings secured to said ring insulated therefrom and from each other, substantially as described.

6. A dynamo-electric machine, having, in combination, a brush-supporting ring and mechanism for adjusting the ring arranged to be disconnected therefrom to allow the ring to be adjusted independently of said mechanism and to be connected thereto in its adjusted position, substantially as described.

7. A dynamo-electric machine, having, in combination, a brush-supporting ring and mechanism for adjusting the ring arranged to be operated from either side of the machine, substantially as described.

8. A dynamo-electric machine, having, in combination, a brush-supporting ring, a screw-threaded shaft extending across the machine provided at each end with means whereby it may be operated, a traveling nut on the shaft and connections between the nut and brush-supporting ring, substantially as described.

9. A dynamo-electric machine, having, in combination, a brush-supporting ring, a screw-threaded shaft, a traveling nut on the shaft, and connections between the nut and brush-supporting ring arranged to be disconnected from said ring to allow the ring to be adjusted independently and to be connected thereto in its adjusted position, substantially as described.

10. A dynamo-electric machine, having, in combination, a commutator, a brush-supporting ring, screws for supporting said ring, adjustable toward and from the commutator arranged to engage the peripheral surface of the ring, and brush-rings secured to said ring insulated therefrom and from each other, substantially as described.

11. A dynamo-electric machine, having, in combination, brush-rings supported side by side provided with inwardly-projecting arms having their inner ends located in the same plane, and brush-holder-supporting studs projecting laterally from the inner ends of the arms, substantially as described.

In testimony whereof I affix my signature in presence of two witnesses.

HERBERT A. BALCOME.

Witnesses:
CHAS. H. ATWOOD,
ROBERT B. ATWOOD.